US010177868B2

United States Patent
Timm et al.

(10) Patent No.: US 10,177,868 B2
(45) Date of Patent: Jan. 8, 2019

(54) SYSTEMS AND METHODS TO SYNCHRONIZE WIRELESS DEVICES IN THE PRESENCE OF A FMCW RADIO ALTIMETER

(71) Applicant: Honeywell International Inc., Morris Plains, NJ (US)

(72) Inventors: Steven L. Timm, Golden Valley, MN (US); Kelly P. Muldoon, Golden Valley, MN (US); Michael R. Franceschini, Centerport, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 69 days.

(21) Appl. No.: 14/972,898

(22) Filed: Dec. 17, 2015

(65) Prior Publication Data

US 2017/0180072 A1 Jun. 22, 2017

(51) Int. Cl.
*H04L 7/00* (2006.01)
*H04J 3/16* (2006.01)
(Continued)

(52) U.S. Cl.
CPC ............ *H04J 3/1694* (2013.01); *G01S 13/34* (2013.01); *H04B 7/18502* (2013.01);
(Continued)

(58) Field of Classification Search
CPC ........................... H04B 7/2662; H04B 7/2671
See application file for complete search history.

(56) References Cited

U.S. PATENT DOCUMENTS 3,742,498 A * 6/1973 Dunn ....................... G01S 13/82
342/88
4,359,733 A 11/1982 O'Neill
(Continued)

FOREIGN PATENT DOCUMENTS

EP 0816866 1/1998
EP 1835668 9/2007
(Continued)

OTHER PUBLICATIONS

Time Synchronization Accuracy in Real-time Wireless Sensor Networks Aamir Mahmood, Riku J"antti Proceedings of the 2009 IEEE 9th Malaysia International Conference on Communications Dec. 15-17, 2009 Kuala Lumpur Malaysia.*
(Continued)

*Primary Examiner* — Andrew W Chriss
*Assistant Examiner* — Lalita W Pace
(74) *Attorney, Agent, or Firm* — Bookoff McAndrews, PLLC

(57) ABSTRACT

Systems and methods to synchronize wireless device nodes in the presence of a FMCW radio altimeter are provided. In one embodiment, a wireless device network comprises: a plurality of device nodes that share a radio frequency spectrum using time-division multiple accesses; a network synchronizing device in wireless communication with the plurality of device nodes, the network synchronizing device coupled to a timeslot allocation function, wherein the timeslot allocation function allocates to the network synchronizing device a timeslot on a first designated synchronization channel within the radio frequency spectrum; wherein the network synchronizing device broadcasts an arbitrary timeslot synchronization beacon to the plurality of device nodes on the first designated synchronization channel in the timeslot; wherein the arbitrary timeslot synchroniza-
(Continued)

tion beacon comprises a Sync Timeslot identifier that identifies the timeslot, and a Sync Time indicator that includes a time that the arbitrary timeslot synchronization beacon was transmitted.

20 Claims, 6 Drawing Sheets

(51) Int. Cl.
G01S 13/34 (2006.01)
H04B 7/185 (2006.01)
H04W 56/00 (2009.01)
H04W 72/04 (2009.01)

(52) U.S. Cl.
CPC ..... *H04W 56/0015* (2013.01); *H04W 72/046* (2013.01); *H04W 72/0446* (2013.01)

(56) References Cited

U.S. PATENT DOCUMENTS

| | | | |
|---|---|---|---|
| 4,427,981 A * | 1/1984 | Kyriakos | G01S 13/345 342/103 |
| 5,142,533 A * | 8/1992 | Crisler | H04J 3/1694 370/348 |
| 5,574,979 A | 11/1996 | West | |
| 5,909,433 A * | 6/1999 | Haartsen | H04W 56/0085 370/337 |
| 5,999,118 A | 12/1999 | Hethuin et al. | |
| 6,314,366 B1 | 11/2001 | Farmakis et al. | |
| 6,377,565 B1 | 4/2002 | Puckette, IV | |
| 6,801,951 B1 * | 10/2004 | Roden, III | G06F 1/14 709/248 |
| 6,850,553 B1 | 2/2005 | Waschka et al. | |
| 6,941,110 B2 | 9/2005 | Kloper et al. | |
| 7,069,076 B2 | 6/2006 | Hedberg et al. | |
| 7,440,427 B1 | 10/2008 | Katz | |
| 7,561,591 B2 | 7/2009 | Hiraoka et al. | |
| 7,634,275 B2 | 12/2009 | Odman | |
| 7,683,827 B2 | 3/2010 | Kelly, Jr. et al. | |
| 7,873,739 B2 | 1/2011 | Hall et al. | |
| 8,188,911 B2 | 5/2012 | Beasley | |
| 8,908,573 B1 | 12/2014 | Wang et al. | |
| 9,065,645 B2 | 6/2015 | Yang et al. | |
| 2002/0072853 A1 | 6/2002 | Sullivan | |
| 2002/0114303 A1 * | 8/2002 | Crosbie | H04B 7/269 370/338 |
| 2003/0035173 A1 * | 2/2003 | Byers | H04B 10/1149 398/98 |
| 2005/0090201 A1 * | 4/2005 | Lengies | H04B 7/18506 455/41.2 |
| 2005/0179583 A1 * | 8/2005 | Jordan | G01S 7/288 342/120 |
| 2005/0182530 A1 * | 8/2005 | Murphy | G01S 19/15 701/16 |
| 2006/0049977 A1 | 3/2006 | Vacanti | |
| 2006/0109831 A1 | 5/2006 | Tillotson | |
| 2006/0114862 A1 | 6/2006 | Hiraoka | |
| 2006/0172705 A1 | 8/2006 | Parthasarathy et al. | |
| 2007/0268819 A1 | 11/2007 | Johansson et al. | |
| 2007/0268884 A1 | 11/2007 | Kolavennu et al. | |
| 2008/0051948 A1 | 2/2008 | Petrich et al. | |
| 2009/0083606 A1 * | 3/2009 | Choi | H04H 20/30 714/776 |
| 2009/0097468 A1 | 4/2009 | Yi et al. | |
| 2009/0116461 A1 | 5/2009 | Yonge, III et al. | |
| 2009/0174594 A1 * | 7/2009 | Thomas | G01O 5/005 342/94 |
| 2009/0289834 A1 | 11/2009 | Devensky | |
| 2010/0085236 A1 * | 4/2010 | Franceschini | G01S 13/765 342/30 |
| 2010/0142590 A1 | 6/2010 | Hohne et al. | |
| 2011/0013526 A1 | 1/2011 | Mosko | |
| 2012/0026941 A1 * | 2/2012 | Ahmad | H04W 48/16 370/328 |
| 2012/0188998 A1 * | 7/2012 | Philips | H04W 56/001 370/350 |
| 2013/0051381 A1 * | 2/2013 | Bracha | H04W 56/00 370/338 |
| 2013/0155748 A1 | 6/2013 | Sundström et al. | |
| 2013/0170505 A1 | 7/2013 | Nemeth et al. | |
| 2013/0230035 A1 | 9/2013 | Grandhi et al. | |
| 2013/0286862 A1 * | 10/2013 | Sartori | H04W 76/14 370/252 |
| 2014/0105194 A1 * | 4/2014 | Wiatrowski | H04B 7/2643 370/337 |
| 2014/0348140 A1 | 11/2014 | Atkinson | |
| 2015/0003468 A1 * | 1/2015 | Thubert | H04B 7/2643 370/442 |
| 2015/0078297 A1 | 3/2015 | Zheng | |
| 2015/0092642 A1 * | 4/2015 | Geboff | H04W 4/008 370/311 |
| 2015/0110004 A1 | 4/2015 | Katz | |
| 2015/0229133 A1 | 8/2015 | Reynolds et al. | |
| 2015/0365155 A1 * | 12/2015 | Subramanian | H04B 7/0697 370/329 |
| 2015/0382171 A1 * | 12/2015 | Roy | H04W 48/16 370/329 |
| 2016/0029409 A1 | 1/2016 | Mueller et al. | |
| 2016/0212702 A1 * | 7/2016 | Ghosh | H04W 52/0216 |
| 2017/0171088 A1 | 6/2017 | Shor et al. | |
| 2017/0176588 A1 | 6/2017 | Franceschini et al. | |
| 2017/0180040 A1 | 6/2017 | Wang et al. | |
| 2017/0180072 A1 | 6/2017 | Timm et al. | |
| 2017/0181146 A1 | 6/2017 | Franceschini et al. | |
| 2017/0230916 A1 * | 8/2017 | Stein | H04W 52/34 |

FOREIGN PATENT DOCUMENTS

| | | | |
|---|---|---|---|
| EP | 1930743 | 6/2008 | |
| WO | 9605562 | 2/1996 | |
| WO | 0199300 | 12/2001 | |
| WO | 03001742 | 1/2003 | |
| WO | 2014078811 | 5/2014 | |
| WO | WO 2016054440 A1 * | 4/2016 | H04W 52/42 |
| WO | 2016142837 | 9/2016 | |

OTHER PUBLICATIONS 4200-4400 MHz Mar. 1, 2014 National Telecommunications and Information Administration, NTIA Special Publication 00-40, Federal Radar Spectrum Requirements (May 2000) at 42.*
2nd Meeting CPG PTC,London, Apr. 16-19, 2013 Date issued: Apr. 8, 2013,Source: Germany Subject: Proposed Updates to the Working Document towards a Preliminary Draft New Report Consideration of the aeronautical mobile (route), aeronautical mobile, and aeronautical radionavigation services allocations to accommodate wireless avionics intra-communica.*
Mahmood et al., Time Synchronization Accuracy in Real-Time Wireless Sensor Networks, Proceedings of the 2009 IEEE 9th Malaysia International Conference on Communications, Dec. 15-17, 2009, pp. 652-657 (Year: 2009).*
National Telecommunications and Information Administration (NTIA), 4200-4400MHz, Mar. 1, 2014 (Year: 2014).*
CPG PTC(13)015_Proposed Updates to the Working Document towards a Preliminary Draft New Report on WAIC Bands, Apr. 16-19, 2013 (Year: 2013).*
"Characteristics of WAIC systems and bandwidth requirements to support their safe operation", "Radiocommunication Study Groups", Dec. 2012, pp. 1-71, Publisher: International Telecommunication Union.
Bluemm et al., "Wireless Aircraft Cabin Communication—An ISM-Band Cognitive Radio Approach", "8th Karlsruhe Workshop on Software Radio", 2014, pp. 127-135.
"Technical characteristics and spectrum requirements of Wireless Avionics Intra-Communications systems to support their safe operation", "M Series Mobile, radiodeteremination, amateur and related satellite services", Dec. 2013, pp. 1-76, Publisher: International Telecommunication Union.

(56) References Cited

OTHER PUBLICATIONS

"Technical characteristics and operational objectives for wireless avionics intra-communications (WAIC)", "M Series Mobile, radiodetermination, amateur and related satellites services", Nov. 2010, pp. i-56, Publisher: International Telecommunication Union.

"Wireless Avionics Intra-Communications (WAIC) An Overview and Application Examples", 2011.

"WAIC Wireless Avionics Intra-Communications", Dec. 9, 2011, pp. 1-2, Publisher: Aerospace Vehicle Systems Institute.

Wattenhofer, "Clock Synchronization", "Ad Hoc and Sensor Networks", Nov. 16, 2009, pp. 1-11.

"Beacon frame", "downloaded from Wikipedia Jul. 20, 2015", Jul. 20, 2015, pp. 1-3.

"European Common Proposals for the Work of the Conference", "World Radiocommunication Conference (WRC-15) dowloaded from internet on Jul. 20, 2015", , pp. 1-3.

Franceschini et al., "Frequency Modulated Continuous Wave Raido Altimeter Spectral Monitoring", "U.S. Appl. No. 14/972,880", dated Dec. 17, 2015, pp. 1-27, Published in: US.

Franceschini et al., "Cognitive Allocation of TDMA Resources in the Presence of a Radio Altimeter", "U.S. Appl. No. 14/972,925, filed Dec. 17, 2015", Dec. 17, 2015, pp. 1-30, Published in: US.

European Patent Office, "Extended European Search Report from EP Application No. 16203907.7 dated Apr. 18, 2017", "from Foreign Counterpart of U.S. Appl. No. 14/972,925", dated Apr. 18, 2017, pp. 1-6, Published in: EP.

European Patent Office, "Extended European Search Report from EP Application No. 16199899.2 dated May 10, 2017", "from Foreign Counterpart of U.S. Appl. No. 14/972,880", dated May 10, 2017, pp. 1-9, Published in: EP.

European Patent Office, "Extended European Search Report from EP Application No. 16199897.6 dated May 11, 2017", "from Foreign Counterpart of U.S. Appl. No. 14/972,898", dated May 11, 2017, pp. 1-6, Published in: EP.

United States Patent and Trademark Office, "Notice of Allowance", "From U.S. Appl. No. 14/972,925", dated Sep. 5, 2017, pp. 1-31, Published in: US.

U.S. Patent and Trademark Office, "Notice of Allowability", "U.S. Appl. No. 14/972,925", dated Nov. 14, 2017, pp. 1-6, Published in: US.

U.S. Patent and Trademark Office, "Office Action for U.S. Appl. No. 14/972,880", dated May 3, 2018 , pp. 1-48, Published in: US.

* cited by examiner

SYSTEMS AND METHODS TO SYNCHRONIZE WIRELESS DEVICES IN THE PRESENCE OF A FMCW RADIO ALTIMETER

CROSS-REFERENCE TO RELATED APPLICATION

This application is related to: U.S. patent application Ser. No. 14/972,925 entitled "COGNITIVE ALLOCATION OF TDMA RESOURCES IN THE PRESENCE OF A RADIO ALTIMETER" filed on even date herewith and U.S. patent application Ser. No. 14/972,880 entitled "FREQUENCY MODULATED CONTINUOUS WAVE RADIO ALTIMETER SPECTRAL MONITORING" filed on even date herewith, both of which are incorporated herein by reference in their entirety.

BACKGROUND

In a Time Division Multiplexed Access (TDMA) based wireless avionics system, a 4235-4400 MHz frequency spectrum may be shared by wireless avionics devices, and an aircraft's Frequency-Modulated Continuous Wave (FMCW) Radio Altimeter (RA). A The radio altimeter transmits a radio frequency signal and looks for a corresponding return signal, continuously sweeping the signal frequency back and forth across the frequency spectrum in a see-saw pattern. For some wireless avionics devices, that same spectrum is used in a TDMA fashion divided into a fixed number of timeslots over a frame period. The frequency spectrum is divided into a number of channels, and timeslots for using those channels are allocated to wireless avionic devices in such a way as to allow them to communicate with the other nodes of the wireless avionic system and not interfere with the radio altimeter. To implement such a TDMA scheme and avoid signal collisions, wireless avionic devices need to be synchronized within a required amount of accuracy to guarantee that transmissions from the wireless avionic devices will not interfere with each other or with the radio altimeter. A constant frequency pulse type beacon is one device often used to synchronize devices across a network by providing a network standard sense of time, each pulse of the beacon marking the passage of some uniform unit of time that has elapsed since a preceding beacon signal occurred. However, the transmission of an in-spectrum pulse beacon for a wireless avionic system sharing spectrum with a radio altimeter would prove problematic because the radio altimeter signal will occasionally occupy the beacon channel at the precise moment the pulse beacon needs to transmit, denying wireless avionic devices the ability to receive the pulse beacon. Further, because the period of a radio altimeter signal pattern can vary, it may occasionally match the period of the pulse beacon which means that several sequential frames of beacon signals may be lost, allowing the internal sense of time at each wireless avionic device to drift beyond tolerance resulting in signal collisions. For example, if a wireless avionic sensor has an internal clock having an accuracy of $10^{-5}$/second, over the duration of a one second frame, up to 10 microseconds of drift could be expected. If not corrected, this drift may exceed the network's drift tolerance of 500 microseconds. Time protocol can be considered to address this problem, but implementing such protocols requires a significant overhead software processing, making it unsuitable for the relatively low complexity and limited processing of a wireless avionic device.

For the reasons stated above and for other reasons stated below which will become apparent to those skilled in the art upon reading and understanding the specification, there is a need in the art for alternate systems and methods to synchronize wireless avionic devices in the presence of a FMCW radio altimeter.

SUMMARY

The Embodiments of the present invention provide methods and systems for providing to synchronize wireless device nodes in the presence of a FMCW radio altimeter and will be understood by reading and studying the following specification.

In one embodiment, a wireless device network comprises: a plurality of device nodes that share a radio frequency spectrum using time-division multiple accesses; a network synchronizing device in wireless communication with the plurality of device nodes, the network synchronizing device coupled to a timeslot allocation function, wherein the timeslot allocation function allocates to the network synchronizing device a timeslot on a first designated synchronization channel within the radio frequency spectrum; wherein the network synchronizing device broadcasts an arbitrary timeslot synchronization beacon to the plurality of device nodes on the first designated synchronization channel in the timeslot; wherein the arbitrary timeslot synchronization beacon comprises a Sync Timeslot identifier that identifies the timeslot, and a Sync Time indicator that includes a time that the arbitrary timeslot synchronization beacon was transmitted.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide systems and methods for synchronizing wireless avionics devices in the presence of a FMCW radio altimeter through the use of an arbitrary timing synchronization beacon. When individual device nodes in a wireless avionic system are initialized, they all start off out of synchronization with each other. Once initially synchronized and in steady state operation, then need to maintain synchronization with the wireless avionic system as a whole so that each node in the system remains in agreement not only as to what the current timeslot is, but also in agreement as to when the next timeslot begins. In Time Domain Multiple Access (TDMA) systems, each node is allocated a period of time (referred to as a timeslot) in which it can transmit without interference from other nodes. For example, in one wireless avionic system, a one second frame is divided into two-thousand timeslots. As such, each sensor needs to know when its allocated timeslot begins and ends within the frame so that transmission collisions with other wireless avionic nodes is avoided. This coordination effort is complicated by the radio altimeter signal because of the frequency sweeping pattern of the radio altimeter signal which has the potential to interfere with any frequency channel used by wireless avionic nodes during any timeslot and can therefore potentially interfere with attempts to use a constant period pulse type beacon.

Instead of having a periodic beacon that always marks the same reference timeslot within the wireless avionic system frame cycle after cycle, with embodiments of the present disclosure, a cognitive device in the wireless avionic system responsible for broadcasting the network synchronization signal does so by utilizing an arbitrary timing synchronization beacon (ATSB). That is, from the perspective of wireless avionic nodes, the ATSB has the potential to occur in any one (or more) of the wireless avionic system frame timeslots. More specifically, the timing of when the next ATSB will occur cannot necessarily be predicted based on the time elapsed since the last ATSB occurrence.

Figure 1:
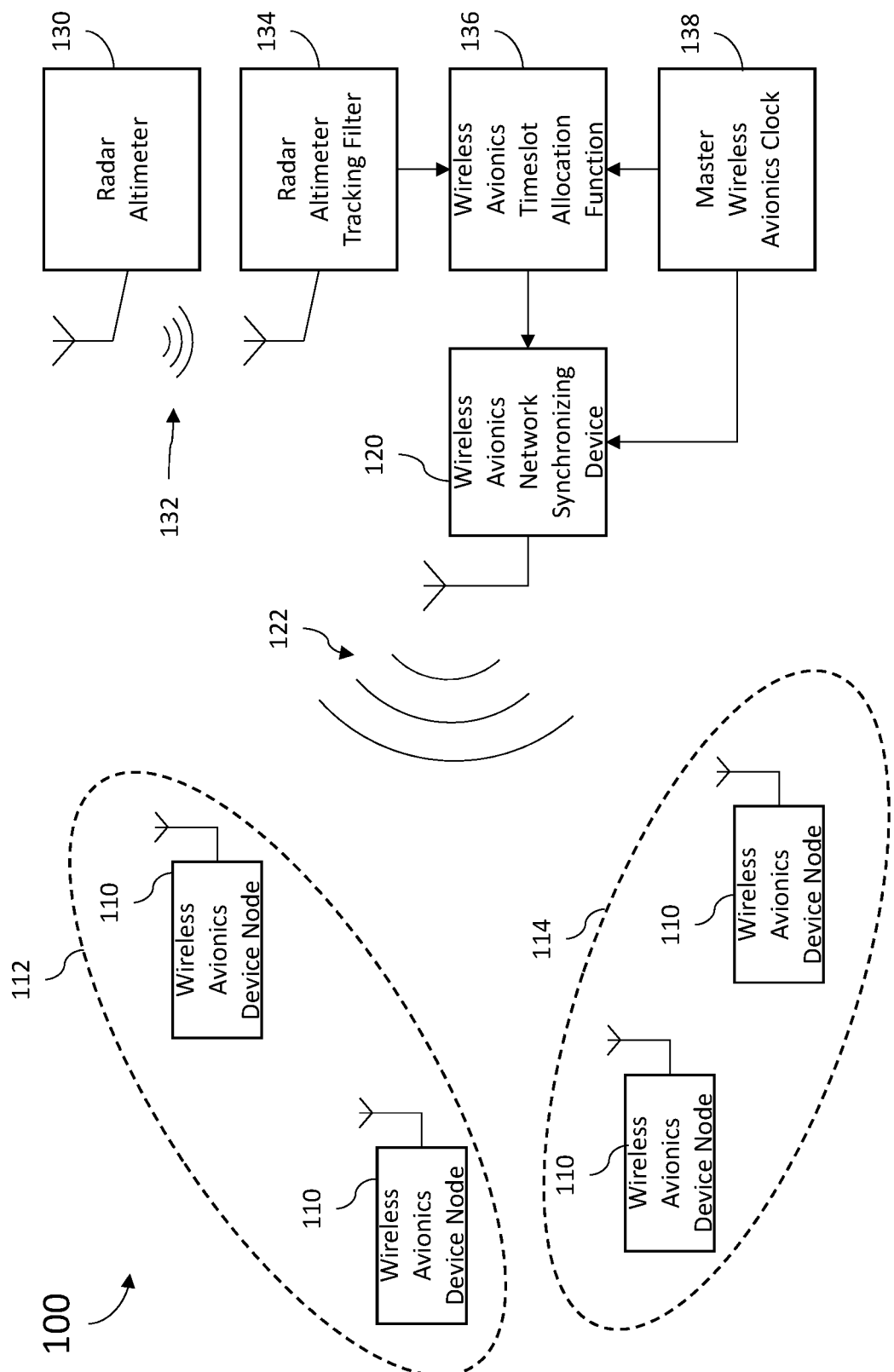
FIG. 1 is a diagram of a wireless avionics device network of one embodiment of the present disclosure.

FIG. 1 is a block diagram illustrating a wireless device network 100 of one embodiment of the present disclosure. In some implementations, wireless device network 100 may comprise a wireless avionics network. In particular, the systems and methods of the present disclosure are applicable to any network using a wireless communications protocol that needs to avoid a signal that periodically sweeps a bandwidth.

As shown in FIG. 1, wireless avionic network 100 comprises a plurality of device nodes 110 (also referred to herein as wireless avionics devices 110), one or more of which comprise wireless avionics sensors. Wireless avionics devices 110 share a radio frequency spectrum using TDMA where each device 110 is granted access to transmit over an RF channel during a specified timeslot allocated to them by a Wireless Avionics Timeslot Allocation Function 136. In one embodiment, each wireless avionics system frame comprises 2000 timeslots and each 2000 timeslot wireless avionics system frame has a duration of one second. Allocation of timeslots to wireless avionics devices 110 is the subject of U.S. patent application Ser. No. 14/972,925 which is incorporated herein by reference. In short, Wireless Avionics Timeslot Allocation Function 136 is provided by Radio Altimeter Tracking Filter 134 inputs including the current amplitude and period of the radio altimeter 130 signal pattern as well as the current frequency and/or channels occupied by the radio altimeter signal 132. Using this data from Radio Altimeter Tracking Filter 134, Wireless Avionics Timeslot Allocation Function 136 allocates timeslots to each of the wireless avionics devices 110 which are calculated not to conflict with the radio altimeter signal 132. In some embodiments, Wireless Avionics Timeslot Allocation Function 136 ranks timeslots from least likely to conflict with the radio altimeter signal to most likely to conflict with the radio altimeter signal. In that case, the least likely to conflict timeslots may be allocated to devices first, with allocation of increasingly more likely to conflict timeslots occurring only as needed to meet bandwidth demands.

Details regarding the tracking and characterization of the radio altimeter signal 132, such as performed by Radio Altimeter Tracking Filter 134, is the subject of U.S. patent application Ser. No. 14/972,880 which is incorporated herein by reference. In short, Radio Altimeter Tracking Filter 134 monitors the radio altimeter signal 132 transmitted by the aircraft's radio altimeter 130 and characterizes the signal 132 by determining the current amplitude and period of the radio altimeter signal pattern. With this data, Wireless Avionics Timeslot Allocation Function 136 can determine the current frequency range and/or channels occupied by the radio altimeter signal 132, and predictively identify timeslots in each of the multiple RF channels used by wireless avionics system network 100 that will not conflict with the radio altimeter signal.

As shown in FIG. 1, wireless avionics system network 100 further comprises Wireless Avionics Network Synchronizing Device 120, which is the cognitive device in the wireless avionics system that is responsible for broadcasting the ATSB (shown at 122) to the wireless avionics devices 110. In one embodiment, Wireless Avionics Timeslot Allocation Function 136 allocates Wireless Avionics Network Synchronizing Device 120 at least one timeslot on a system designated synchronization channel within the wireless network system radio frequency spectrum that is calculated not to conflict with the radio altimeter signal 132. For at least one frame, the ATSB 122 is then transmitted in that timeslot on the system designated synchronization channel. Because the timeslot used to transmit the ATSB 122 is selected to avoid collisions with the continuously sweeping radio altimeter signal 132, the timeslot allocated to the Wireless Avionics Network Synchronizing Device 120 can shift between different timeslots from one wireless avionics system frame to the next.

Figure 1A:
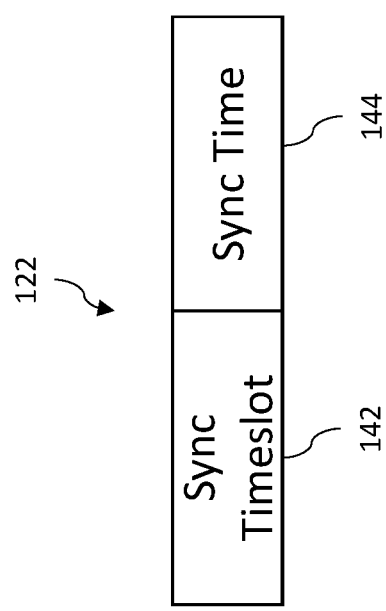
FIG. 1A is diagram of an arbitrary timeslot synchronization beacon of one embodiment of the present disclosure.

In one embodiment, Wireless Avionics Network Synchronizing Device 120 will transmit the ATSB 122 at start of its allocated timeslot. FIG. 1A illustrate one example implementation of an ATSB 122 that contains both an indication of the current time slot (referred to herein as the "Sync Timeslot") and a time, according to Wireless Avionics Network Synchronizing Device 120, that the ATSB 122 was transmitted (referred to herein as the "Sync Time"). In one embodiment, Wireless Avionics Network Synchronizing Device 120 and Wireless Avionics Timeslot Allocation Function 136 are both locked to the same Master Wireless Avionics Clock 138 and use the Master Wireless Avionics Clock 138 to maintain a common sense of timeslot timing.

Figure 2:
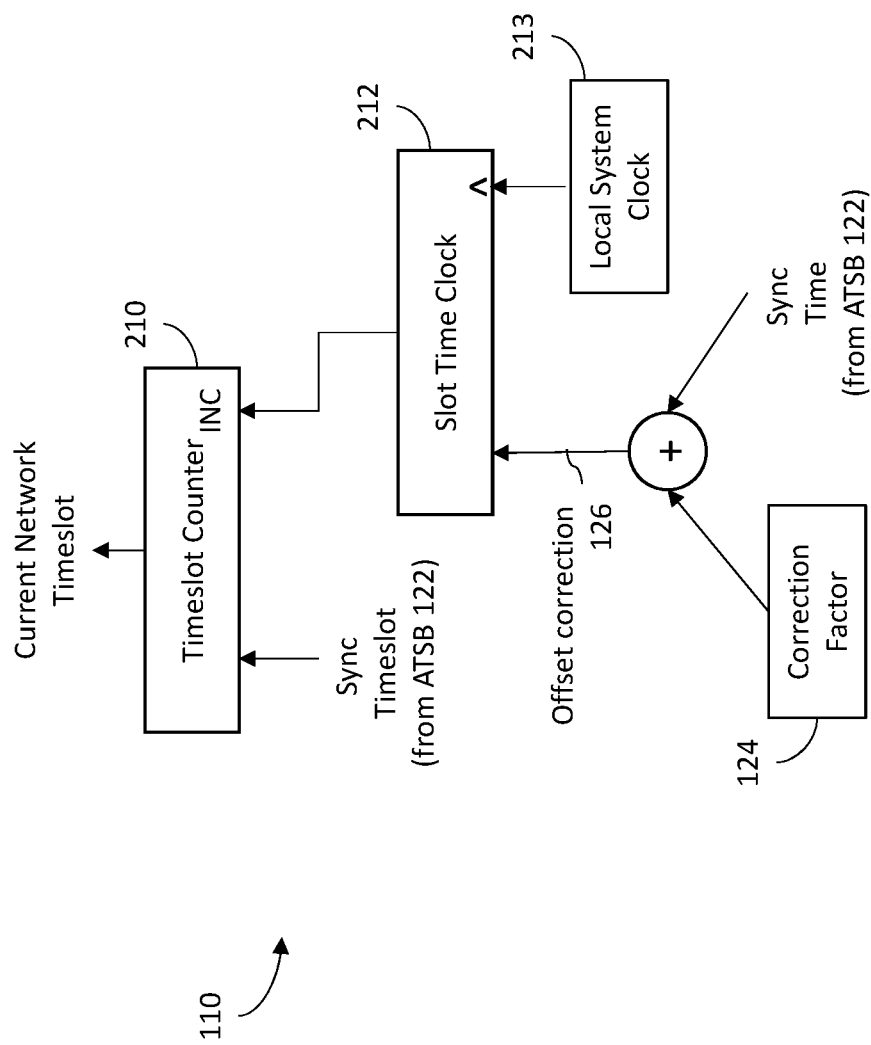
FIG. 2 is diagram of a wireless avionic device node of one embodiment of the present disclosure.

FIG. 2 is an illustration of an example device node 110 that comprises and maintains its own timeslot counter 210 and slot time clock 212. The slot counter 210 indicates to wireless avionics device 110 which timeslot within the wireless avionics system frame is the current timeslot. The slot time clock 212 is configured to track the duration of each timeslot and is locked to the node's Local System Clock 213 to keep track of the edges of each timeslot, that is—the time at which each timeslot is supposed to start and end. When slot time clock 212 indicates the end of the current timeslot, the slot time in the current timeslot counter 210 is incremented by one up to the maximum slot count for the wireless avionics system frame, at which point it rolls over to timeslot zero.

When the ATSB 122 is received at a wireless avionics device 110, the receiving node's timeslot counter 210 is updated to agree with the Sync Timeslot value from the ATSB 122. The Sync Time included with the ATSB 122 is added to a pre-computed correction factor 124 to produce an offset correction 126. The slot time clock 212 is then adjusted by an amount that specified by the offset correction 126. The pre-computed correction factor 124 is a constant stored in memory that estimates a one way delay starting from the moment the sync time data was put into the ATSB 122 until the moment it was extracted by the receiving wireless avionics device 110. This delay estimate is unique to every wireless avionics device 110 due to component variations between devices and the relative distance the ATSB 122 signal must propagate from the Wireless Avionics Network Synchronizing Device 120 to each receiving wireless avionics device 110. It should also be appreciated that the Timeslot Counter 210 and Slot Time Clock 212 can be implemented achieved by a device node 110 using a single combined clock where timeslots and/or their starting and ending edges are decoded from that single combined clock.

Figure 3:
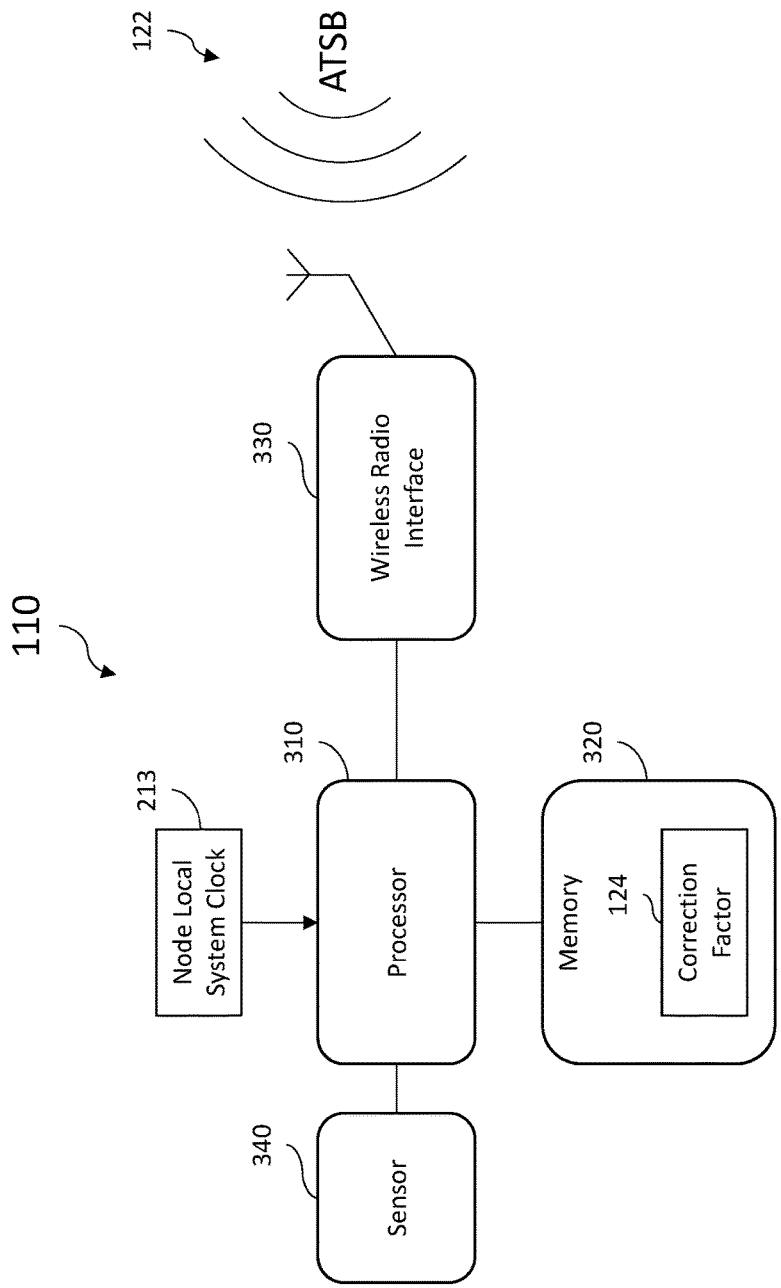
FIG. 3 is diagram of a wireless avionic device node of one embodiment of the present disclosure.

FIG. 3 is a block diagram illustrating one implementation of a wireless avionics device 110 according to an example embodiment of the present disclosure which may be used to implement any of the wireless avionics devices 110 shown in FIG. 1. As shown in FIG. 3, wireless avionics device 110 comprises a processor 310, a memory 320, and a wireless radio interface 330. Processor 310 is coupled to the local system clock 213 discussed in FIG. 2. Wireless avionics device 110 may also comprise one or more sensors 340 that input measurement data to processor 310 to be shared with one or more other wireless avionics devices on the wireless avionics system network 100.

In one embodiment, to synchronize wireless avionics device 110 with wireless avionics system network 100, wireless radio interface 330 receives the ATSB 122 signal. In one implementation, wireless avionics device 110 may continuously monitor for an incoming ATSB 122. In other implementations, to conserve power, wireless avionics device 110 may monitor for an incoming ATSB 122 until one is received, and then suspend the processing of monitoring for an incoming ATSB 122 until the start of the next wireless avionics system frame. For example, if a wireless avionics device received an ATSB 122 during timeslot X of a wireless avionics system frame, it would not again look for an ATSB 122 until Timeslot 0 of the next wireless avionics system frame begins.

In one embodiment, processor 310 extracts the Sync Timeslot and Sync Time information from ATSB 122 and updates Timeslot Counter 210 and Slot Time Clock 212 as described above. In one embodiment, Timeslot Counter 210 and Slot Time Clock 212 may be implemented using software executed by processor 310. In other embodiments, one or both of Timeslot Counter 210 and Slot Time Clock 212 may be implemented using discrete components within wireless avionics device 110 coupled to processor 310. Further, in some embodiments, the functions associated with Timeslot Counter 210 and Slot Time Clock 212 described above may be achieved by a device node 110 using a single combined clock where processor 310 decodes timeslots and/or their starting and ending edges from that single combined clock. In one embodiment, the correction factor 124 discussed in FIG. 2 may be stored in memory 320 and retrieved by processor 310 in order to calculate the offset correction 126. In one implementation, correction factor 124 is calculated for wireless avionics device 110 based in part on factory testing or other means, and saved in a non-volatile read-only portion of memory 320.

Figure 4:
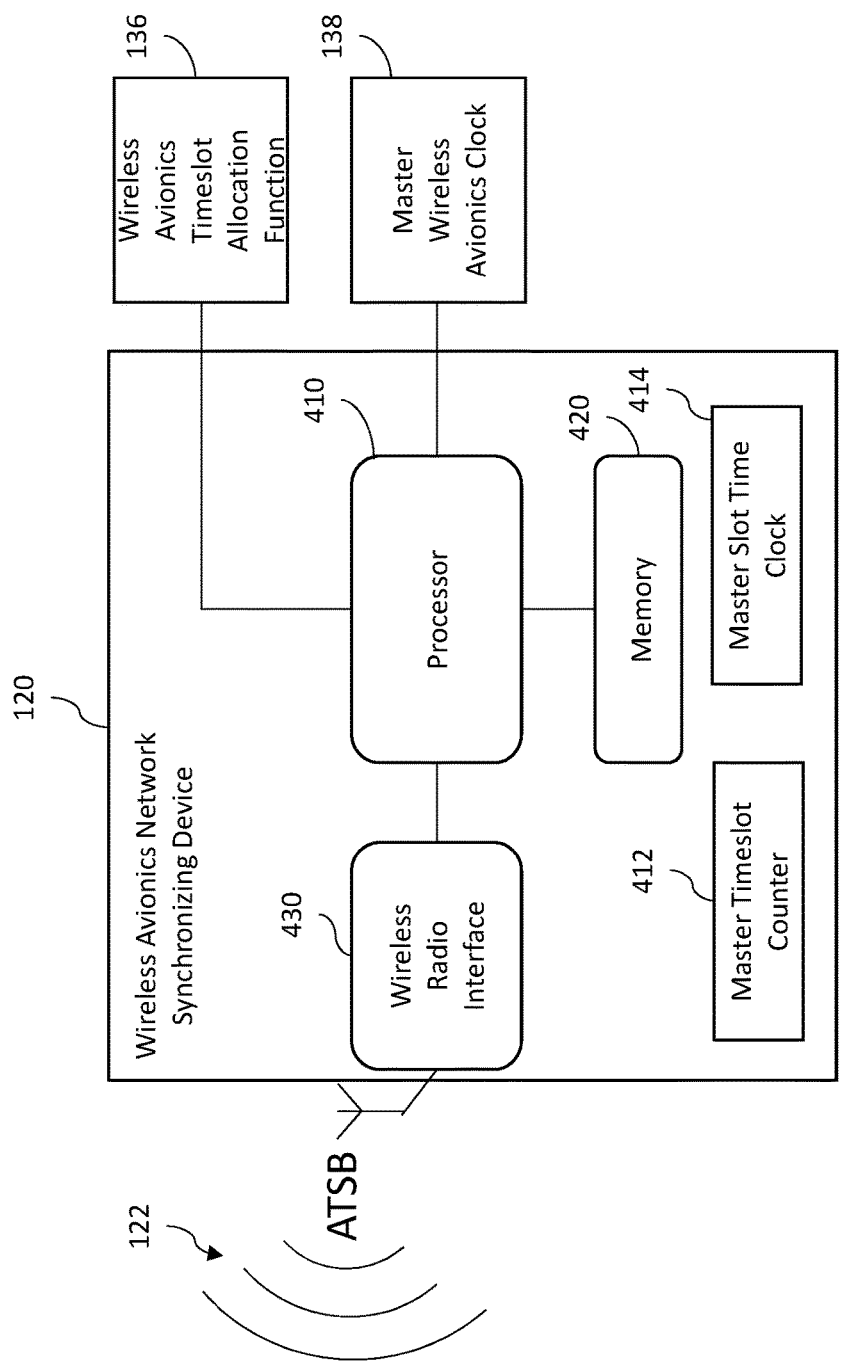
FIG. 4 is a diagram of a wireless avionic network synchronization device of one embodiment of the present disclosure.

FIG. 4 is a block diagram illustrating one implementation of a Wireless Avionics Network Synchronizing Device 120 according to an example embodiment of the present disclosure. Although shown as separate devices in FIG. 1, it should be appreciated that Wireless Avionics Network Synchronizing Device 120 may be integrated with at least one of Wireless Avionics Timeslot Allocation Function 136, Radio Altimeter Tracking Filter 134, and/or Master Wireless Avionics Clock 138.

As shown in FIG. 4, in one implementation Wireless Avionics Network Synchronizing Device 120 comprises a processor 410, memory 420 and a wireless radio interface 430. In one embodiment, based on a clock signal from the Master Wireless Avionics Clock 138, processor 410 maintains a Master Timeslot Counter 412 (which indicates the current timeslot of the current wireless avionics system frame) and a Master Slot Time Clock 414 (which regulates the starting and ending edges of the current timeslot). In operation, processor 410 receives a timeslot allocation from Wireless Avionics Timeslot Allocation Function 136 indicated a timeslot in which it is permitted to transmit the ATSB 122. At the start of that timeslot, processor 410 generates an ATSB 122, inserting into the message the Sync Timeslot as indicated by Master Timeslot Counter 412 and the Sync Time, which indicates the time that the ATSB 122 was transmitted. In alternate embodiments, the Sync Time may be derived from the Master Slot Time Clock 414, the Master Wireless Avionics Clock 138, or both. The ATSB 122 is transmitted by wireless radio interface 430 on the system designated synchronization channel.

In alternate embodiments, different ATSB 122 signals may be generated by Wireless Avionics Network Synchronizing Device 120 for different subset of wireless avionics system network 100. For example, referring to FIG. 1, in one embodiment, wireless avionics devices 110 may be divided into a first wireless avionics subnet 112 and a second wireless avionics subnet 114. For example, the wireless avionics devices 110 of subnet 112 may comprise aircraft cabin area monitors while the wireless avionics devices 110 of subnet 114 may comprise aircraft cargo area monitors. In one such embodiment, Wireless Avionics Network Synchronizing Device 120 may transmit independent ATSB 122 signals, on separate system designated synchronization channels, for each subnet. For example, Wireless Avionics Network Synchronizing Device 120 may transmit a first ATSB 122 for subnet 112 over a first designated synchronization channel, and a second ATSB 122 for subnet 114 over a second designated synchronization channel. For each designated synchronization channel, the respective ATSB 122 will be transmitted in a timeslot allocated by Wireless Avionics Timeslot Allocation Function 136 selected to avoid conflict with the frequency sweeping radio altimeter signal 132.

Figure 5:
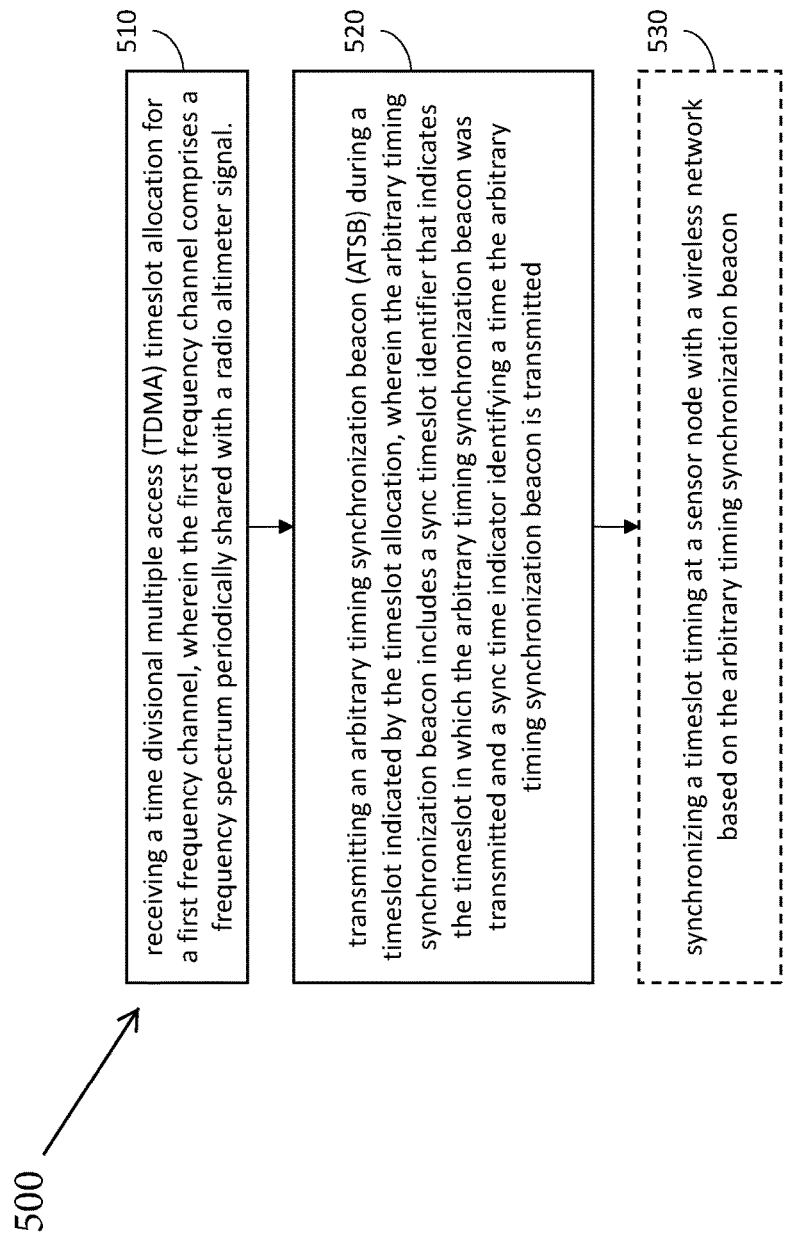
FIG. 5 is a flow chart illustrating a method of one embodiment of the present disclosure.

FIG. 5 is a flow chart illustrating a method 500 of one embodiment of the present disclosure. It should be understood that method 500 may be implemented using any one of the embodiments described above in FIG. 1-4. As such, elements of method 500 may be used in conjunction with, in combination with, or substituted for elements of the embodiments described above. Further, the functions, structures and other description of elements for such embodiments described above may apply to like named elements of method 500 and vice versa.

The method begins at 510 with receiving a time divisional multiple access (TDMA) timeslot allocation for a first frequency channel, wherein the first frequency channel comprises a frequency spectrum periodically shared with a radio altimeter signal.

In one embodiment, a Timeslot Allocation Function is provided inputs from a Radio Altimeter Tracking Filter that indicates the current amplitude and period of the radio altimeter signal pattern as well as the current frequency and/or channels occupied by the radio altimeter signal. Using this data from the Radio Altimeter Tracking Filter, the Timeslot Allocation Function allocates a timeslot for the first frequency channel that will not conflict with the radio altimeter signal. That is, they will not both concurrently occupy the same channel at the same time. In some embodiments, the Timeslot Allocation Function ranks timeslots from least likely to conflict with the radio altimeter signal to most likely to conflict with the radio altimeter signal. Because of the importance of synchronization, in one embodiment, the Timeslot Allocation function will allocate a timeslot that is less likely to conflict for transmitting an ATSB.

The method proceeds to 520 with transmitting an arbitrary timing synchronization beacon (ATSB) during a timeslot indicated by the timeslot allocation, wherein the arbitrary timing synchronization beacon includes a sync timeslot identifier that indicates the timeslot in which the arbitrary timing synchronization beacon was transmitted and a sync time indicator identifying a time the arbitrary timing synchronization beacon is transmitted. In one embodiment, Wireless Avionics Network Synchronizing Device 120 will transmit the ATSB 122 at start of its allocated timeslot. FIG. 1B illustrates on example of an ATSB 122 that contains both an indication of the current time slot (the "Sync Timeslot") and a time, according to Wireless Avionics Network Synchronizing Device 120, that the ATSB 122 was transmitted (the "Sync Time"). Instead of having a periodic beacon that always marks the same reference timeslot within the wireless avionics system frame cycle after cycle, with embodiments of the present disclosure, the ATSB has the potential to occur in any one (or more) of the wireless avionics system frame timeslots. The timing of when the next ATSB will occur cannot necessarily be predicted based on the time elapsed since the last ATSB occurrence. Despite this lack of periodicity, the wireless avionics devices are able to lock into synchronization with the wireless avionics system network because the ATSB itself conveys timeslot timing information that permit the wireless avionics devices to do so. By delinking the synchronization beacon with a specific periodicity (e.g., the cyclic occurrence of a specific timeslot), embodiments of the present disclosure permit a network of wirelessly coupled nodes (such as wireless avionics system network 100) to compatibly co-exists on an aircraft using the same frequency spectrum as a Frequency-Modulated Continuous Wave Radio Altimeter.

As described above, in one implementation, the method may then proceed to 530 with synchronizing a timeslot timing at a sensor node with a wireless network based on the arbitrary timing synchronization beacon. In one embodiment, at a sensor node receiving the arbitrary timing synchronization beacon, synchronizing the timeslot timing comprises adjusting a timeslot counter based on the sync timeslot identifier and adjusting a slot time clock based on the sync time indicator, as described above. For example, in one embodiment, when the ATSB is received at the sensor node (e.g., a wireless avionics device) the receiving node's timeslot counter is updated to agree with the Sync Timeslot value from the ATSB. The Sync Time included with the ATSB may be added to a pre-computed correction factor to produce an offset correction. The slot time clock is then adjusted by an amount that specified by the offset correction. The pre-computed correction factor is a constant stored in memory that estimates a one way delay starting from the moment the sync time data was put into the ATSB until the moment it was extracted by the receiving wireless avionics device. This delay estimate is unique to every wireless avionics device due to component variations between devices and the relative distance the ATSB signal must propagate from the Wireless Avionics Network Synchronizing Device to each receiving wireless avionics device.

Example Embodiments

Example 1 includes a wireless device network, the network comprising: a plurality of device nodes that share a radio frequency spectrum using time-division multiple accesses; a network synchronizing device in wireless communication with the plurality of device nodes, the network synchronizing device coupled to a timeslot allocation function, wherein the timeslot allocation function allocates to the network synchronizing device a timeslot on a first designated synchronization channel within the radio frequency spectrum; wherein the network synchronizing device broadcasts an arbitrary timeslot synchronization beacon to the plurality of device nodes on the first designated synchronization channel in the timeslot; wherein the arbitrary timeslot synchronization beacon comprises a Sync Timeslot identifier that identifies the timeslot, and a Sync Time indicator that includes a time that the arbitrary timeslot synchronization beacon was transmitted.

Example 2 includes the network of any of examples 1, wherein the plurality of device nodes each comprise a Timeslot Counter, a Slot Time Clock, and a processor; wherein the processor is configured to update the Timeslot Counter based on the Sync Timeslot and update the Slot Time Clock based on an offset correction calculated as a function of the Sync Time and a Correction Factor.

Example 3 includes the network of example 2, the plurality of device nodes each further comprising a memory, wherein the Correction Factor is a constant stored in the memory.

Example 4 includes the network of any of examples 2-3, wherein the Correction Factor is a time delay value estimate of a one way delay starting from a moment the Sync Time is inserted into the arbitrary timeslot synchronization beacon until is it extracted at a receiving device node.

Example 5 includes the network of any of examples 1-4, further comprising: a radio altimeter tracking filter, wherein the radio altimeter tracking filter monitors and characterizes a radio altimeter signal transmitted by a frequency-modulated continuous wave radio altimeter, wherein the frequency-modulated continuous wave radio altimeter transmits the radio altimeter signal across the radio frequency spectrum that includes the first designated synchronization channel; wherein based on data provided by the radio altimeter tracking filter, the timeslot allocation function predictively identifies timeslots in the first designated synchronization channel that will not conflict with the radio altimeter signal.

Example 6 includes the network of example 5, wherein the timeslot allocation function is integrated with one or both of the radio altimeter tracking filter or the network synchronizing device.

Example 7 includes the network of any of examples 1-6, wherein the plurality of device nodes comprise a plurality of wireless avionics devices.

Example 8 includes the network of any of examples 1-7, wherein the arbitrary timeslot synchronization beacon is transmitted at a start of the timeslot.

Example 9 includes the network of any of examples 1-8, wherein the plurality of device nodes comprise at least a first subnet of device nodes and a second subnet of device nodes; wherein the network synchronizing device transmits a first arbitrary timeslot synchronization beacon on the first designated synchronization channel utilized by the first subnet of device nodes; and wherein the network synchronizing device transmits a second arbitrary timeslot synchronization beacon on a second designated synchronization channel utilized by the second subnet of device nodes.

Example 10 includes a network synchronizing device for a wireless system network, the device comprising: a wireless radio interface; and a processor coupled to a memory; wherein based on a clock signal from a Master Wireless Clock, the processor maintains a Master Timeslot Counter that indicates a current timeslot of a current wireless system frame, and a Master Slot Time Clock that defines starting and ending edges of the current timeslot; wherein the processor is configured to receive a timeslot allocation from a Wireless Timeslot Allocation Function that indicates a timeslot in which it is permitted to transmit an arbitrary timeslot synchronization beacon on a first designated synchronization channel; wherein when the timeslot occurs, the processor transmits, via the wireless radio interface, the arbitrary timeslot synchronization beacon, the arbitrary timeslot synchronization beacon comprising a Sync Timeslot identifier as indicated by the Master Timeslot Counter and a Sync Time indicator that indicates a time that the arbitrary timeslot synchronization beacon was transmitted.

Example 11 includes the device of example 10, wherein the Sync Time indicator is derived from a time value provided by the Master Slot Time Clock, a Master Wireless Clock, or both.

Example 12 includes a method for synchronizing a wireless network sharing a radio spectrum with a radio altimeter, the method comprising: receiving a time divisional multiple access (TDMA) timeslot allocation for a first frequency channel, wherein the first frequency channel comprises a frequency spectrum periodically shared with a radio altimeter signal; and transmitting an arbitrary timing synchronization beacon (ATSB) during a timeslot indicated by the timeslot allocation, wherein the arbitrary timing synchronization beacon includes a sync timeslot identifier that indicates the timeslot in which the arbitrary timing synchronization beacon was transmitted and a sync time indicator identifying a time the arbitrary timing synchronization beacon is transmitted.

Example 13 includes the method of examples 12, further comprising: synchronizing a timeslot timing at a device node with a wireless network based on the arbitrary timing synchronization beacon.

Example 14 includes the method of example 13, wherein synchronizing a timeslot timing at the device node comprises: updating a Timeslot Counter at the device node based on the Sync Timeslot identifier; and updating a Slot Time Clock at the device node based on an offset correction calculated as a function of the sync time indicator and a correction factor.

Example 15 includes the method of any of examples 13-14, further comprising retrieving the correction factor from a memory at the device node.

Example 16 includes the method of example 15, wherein the Correction Factor is a time delay value estimate of a one way delay starting from a moment the Sync Time indicator is inserted into the arbitrary timeslot synchronization beacon until is it extracted at a receiving device node.

Example 17 includes the method of any of examples 12-16, wherein transmitting the arbitrary timing synchronization beacon (ATSB) further comprises wirelessly broadcasting the arbitrary timing synchronization beacon to a plurality of wireless avionics devices aboard an aircraft.

Example 18 includes the method of any of examples 12-17, further comprising: characterizing the radio altimeter signal to predictively identify timeslots in the first frequency channel that will not conflict with the radio altimeter signal.

Example 19 includes the method of any of examples 12-18, further comprising: receiving the time divisional multiple access (TDMA) timeslot allocation from a timeslot allocation function, wherein the timeslot allocation function receives inputs from a radio altimeter tracking filter that indicates a current amplitude and period of the radio altimeter signal; wherein timeslot allocation function allocates the timeslot for the first frequency channel based on the inputs from the radio altimeter tracking filter.

Example 20 includes the method of any of examples 12-19, further comprising: transmitting a first arbitrary timeslot synchronization beacon on a first designated synchronization channel utilized by a first subnet of device nodes; and transmitting a second arbitrary timeslot synchronization beacon on a second designated synchronization channel utilized by a second subnet of device nodes.

In various alternative embodiments, system elements, method steps, or examples described throughout this disclosure (such as the wireless avionics devices and device nodes, the Wireless Avionics Network Synchronizing Device, Wireless Avionics Timeslot Allocation Function, Radio Altimeter Tracking Filter, and/or Master Wireless Avionics Clock, or sub-parts thereof, for example) may be implemented using one or more computer systems, field programmable gate arrays (FPGAs), or similar devices comprising a processor coupled to a memory (such as shown in FIG. 3 or 4, for example) and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A wireless device network, the network comprising:
   a plurality of device nodes that share a radio frequency spectrum using time-division multiple accesses;
   a network synchronizing device in wireless communication with the plurality of device nodes, the network synchronizing device coupled to a timeslot allocation function, wherein the timeslot allocation function allocates to the network synchronizing device an allocated timeslot from a frame of timeslots on a first designated synchronization channel within the radio frequency spectrum;
   wherein the network synchronizing device broadcasts an arbitrary timeslot synchronization beacon to the plurality of device nodes on the first designated synchronization channel in the allocated timeslot, wherein the arbitrary timeslot synchronization beacon is arbitrary in that the allocated timeslot from the frame of timeslots for broadcasting of the arbitrary timeslot synchronization beacon is delinked from any periodicity;
   wherein the arbitrary timeslot synchronization beacon comprises a Sync Timeslot identifier that indicates which timeslot of the frame of timeslots the arbitrary timeslot synchronization beacon was transmitted in, and a Sync Time indicator that includes a time that the arbitrary timeslot synchronization beacon was transmitted.

2. The network of claim 1, wherein the plurality of device nodes each comprise a Timeslot Counter, a Slot Time Clock, and a processor;
   wherein the processor is configured to update the Timeslot Counter based on the Sync Timeslot identifier and update the Slot Time Clock based on an offset correction calculated as a function of the Sync Time indicator and a Correction Factor.

3. The network of claim 2, the plurality of device nodes each further comprising a memory, wherein the Correction Factor is a constant stored in the memory.

4. The network of claim 2, wherein the Correction Factor is a time delay value estimate of a one way delay starting from a moment the Sync Time indicator is inserted into the arbitrary timeslot synchronization beacon until it is extracted at a receiving device node.

5. The network of claim 1, further comprising:
   a radio altimeter tracking filter, wherein the radio altimeter tracking filter monitors and characterizes a radio altimeter signal transmitted by a frequency-modulated continuous wave radio altimeter, wherein the frequency-modulated continuous wave radio altimeter transmits the radio altimeter signal across the radio frequency spectrum that includes the first designated synchronization channel;
   wherein based on data provided by the radio altimeter tracking filter, the timeslot allocation function predictively identifies timeslots in the first designated synchronization channel that will not conflict with the radio altimeter signal.

6. The network of claim 5, wherein the timeslot allocation function is integrated with one or both of the radio altimeter tracking filter or the network synchronizing device.

7. The network of claim 1, wherein the plurality of device nodes comprise a plurality of wireless avionics devices.

8. The network of claim 1, wherein the arbitrary timeslot synchronization beacon is transmitted at a start of the allocated timeslot.

9. The network of claim 1, wherein the plurality of device nodes comprise at least a first subnet of device nodes and a second subnet of device nodes;
   wherein the network synchronizing device transmits a first arbitrary timeslot synchronization beacon on the first designated synchronization channel utilized by the first subnet of device nodes; and
   wherein the network synchronizing device transmits a second arbitrary timeslot synchronization beacon on a second designated synchronization channel utilized by the second subnet of device nodes.

10. A network synchronizing device for a wireless system network, the device comprising:
    a wireless radio interface; and
    a processor coupled to a memory;
    wherein based on a clock signal from a Master Wireless Clock, the processor maintains a Master Timeslot Counter that indicates a current timeslot of a current wireless system frame, and a Master Slot Time Clock that defines starting and ending edges of the current timeslot;
    wherein the processor is configured to receive a timeslot allocation from a Wireless Timeslot Allocation Function that indicates an allocated timeslot from a frame of timeslots in which it is permitted to transmit an arbitrary timeslot synchronization beacon on a first designated synchronization channel;
    wherein when the allocated timeslot occurs, the processor transmits, via the wireless radio interface, the arbitrary timeslot synchronization beacon, the arbitrary timeslot synchronization beacon comprising a Sync Timeslot identifier that identified which timeslot of the frame of timeslots the arbitrary timeslot synchronization beacon was transmitted in as indicated by the Master Timeslot Counter and a Sync Time indicator that indicates a time that the arbitrary timeslot synchronization beacon was transmitted;
    wherein the arbitrary timeslot synchronization beacon is arbitrary in that the allocated timeslot from the frame of timeslots for broadcasting of the arbitrary timeslot synchronization beacon is delinked from any periodicity.

11. The device of claim 10, wherein the Sync Time indicator is derived from a time value provided by the Master Slot Time Clock, the Master Wireless Clock, or both.

12. A method for synchronizing a wireless network sharing a radio spectrum with a radio altimeter, the method comprising:
    receiving a time divisional multiple access (TDMA) timeslot allocation for a first frequency channel, wherein the first frequency channel comprises a frequency spectrum periodically shared with a radio altimeter signal; and
    transmitting an arbitrary timeslot synchronization beacon (ATSB) during an allocated timeslot from a frame of timeslots indicated by the timeslot allocation, wherein the arbitrary timeslot synchronization beacon includes a sync timeslot identifier that indicates which timeslot of the frame of timeslots the arbitrary timeslot synchronization beacon was transmitted in, and a sync time indicator identifying a time the arbitrary timeslot synchronization beacon is transmitted;

wherein the arbitrary timeslot synchronization beacon is arbitrary in that the allocated timeslot from the frame of timeslots for broadcasting of the arbitrary timeslot synchronization beacon is delinked from any periodicity.

13. The method of claim 12, further comprising:
synchronizing a timeslot timing at a device node with a wireless network based on the arbitrary timeslot synchronization beacon.

14. The method of claim 13, wherein synchronizing a timeslot timing at the device node comprises:
updating a Timeslot Counter at the device node based on the Sync Timeslot identifier;
updating a Slot Time Clock at the device node based on an offset correction calculated as a function of the sync time indicator and a correction factor.

15. The method of claim 13, further comprising retrieving the correction factor from a memory at the device node.

16. The method of claim 15, wherein the Correction Factor is a time delay value estimate of a one way delay starting from a moment the Sync Time indicator is inserted into the arbitrary timeslot synchronization beacon until it is extracted at a receiving device node.

17. The method of claim 12, wherein transmitting the arbitrary timeslot synchronization beacon (ATSB) further comprises wirelessly broadcasting the arbitrary timeslot synchronization beacon to a plurality of wireless avionics devices aboard an aircraft.

18. The method of claim 12, further comprising:
characterizing the radio altimeter signal to predictively identify timeslots in the first frequency channel that will not conflict with the radio altimeter signal.

19. The method of claim 12, further comprising:
receiving the time divisional multiple access (TDMA) timeslot allocation from a timeslot allocation function, wherein the timeslot allocation function receives inputs from a radio altimeter tracking filter that indicates a current amplitude and period of the radio altimeter signal;
wherein the timeslot allocation function allocates the allocated timeslot for the first frequency channel based on the inputs from the radio altimeter tracking filter.

20. The method of claim 12, further comprising:
transmitting a first arbitrary timeslot synchronization beacon on a first designated synchronization channel utilized by a first subnet of device nodes; and
transmitting a second arbitrary timeslot synchronization beacon on a second designated synchronization channel utilized by a second subnet of device nodes.

* * * * *